UNITED STATES PATENT OFFICE.

LORENZ ACH, OF MANNHEIM, GERMANY, ASSIGNOR TO C. F. BOEHRINGER & SOEHNE, OF MANNHEIM-WALDORF, GERMANY, A FIRM.

PYROXYLIN PLASTIC AND METHOD OF MAKING SAME.

996,191.  Specification of Letters Patent.  Patented June 27, 1911.

No Drawing.   Application filed December 4, 1907. Serial No. 405,101.

*To all whom it may concern:*

Be it known that I, LORENZ ACH, a citizen of the German Empire, residing at Mannheim, Germany, have invented certain new and useful Improvements in Pyroxylin Plastics and Methods of Making the Same; and I do hereby declare the following to be a full, clear, and exact description of the invention, such as will enable others skilled in the art to which it appertains to make and use the same.

This invention relates to pyroxylin plastics and methods of making the same; and consists in a pyroxylin plastic colloided with an organic body namely an organic cyclic oxid having the property of forming colloid salt-like combinations with pyroxylin and in a process of forming such a plastic body which consists in uniting pyroxylin with such an organic body under suitable thermal and other conditions to produce a homogeneous plastic material; all as more fully hereinafter set forth and as claimed. By organic cyclic oxids I mean cyclic compounds containing oxygen linked in the ring between two carbon atoms which latter have no further oxygen (outside of the ring system) directly attached.

The usual view of celluloid and like pyroxylin plastics made with camphor and similar bodies is that the camphor plays the part of a simple solvent, the resultant product being what is known as a solid solution. This view has been discovered to be erroneous, such pyroxylin plastics being more in the nature of salt-like combinations in which the pyroxylin plays the part of a feeble acid, at least to some extent, and forms a union with feebly basic groups in the camphor. This explains the non-success which has hitherto accompanied efforts to produce like results with other bodies, such other bodies being generally mere solvents and lacking the chemical properties of the camphor. It has been further discovered that many other bodies have the same power of producing combinations with the pyroxylin molecule and of forming with it compositions having the valuable desirable physical properties of ordinary camphor-pyroxylin plastics or "celluloid." This property attaches to many slightly basic bodies of a cyclic constitution containing linking oxygen; such bodies proving excellent solvents for pyroxylin and forming with it compound bodies which are useful as plastics. The groups linked on to the oxygen in the cyclic system are, for present purposes, of subsidiary importance, and may be of very variable nature. Bodies of aromatic, hydroaromatic and aliphatic constitution having oxygen in the described condition are applicable to the present purpose. The ring containing the oxygen may have one or more linking oxygen atoms; but preferably there is a plurality. The ordinary cyclic ethers and combinations of the nature of ethylene oxid are applicable, but it is preferable to use substances containing at least two oxygen atoms in the ring, such as, for example, substances of the constitution

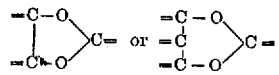

in which the unsatisfied bonds shown may be satisfied by any suitable groups (oxygen excepted). Substances containing three oxygens in the cycle, such as

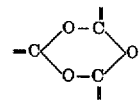

are also applicable. In all cases, it will be observed, the compound employed under this invention is an organic compound containing oxygen and, preferably, a plurality of oxygen atoms linked in a closed chain between carbon atoms, to which carbon atoms, however, no further oxygen is directly attached. The constitution may be even more complicated. The side chains may be aromatic or aliphatic, or both.

Bodies of the stated constitution have the property of acting in a feebly basic manner and will unite with pyroxylin to form compound salt-like bodies of a celluloid nature, and highly plastic.

Compositions of the nature may be produced by condensing aldehydes or ketones with polyhydric alcohols, as, for instance, by condensing acetone, formaldehyde, benzaldehyde or the like with glycol, trimethyleneglycol, glycerin, erythrite, adonite, mannite, arabite, dulcite and the like. For example, there may be used cineol, pinol, paraldehyde, glycid, glycid acetate, ethylglycid ether, methylene-ethylene ether, methylene-glycerin, glycerin-monochlor-hydrineformal, erythritediformal, adonitediformal, rhamnite-diformal, mannitetriformal, ethyleneglycolether, ethylidenepropylene ether, ethylidenetrimethylene ether, acetoglyceral, triethylidenemannite, acetone-glycerin, diacetone erythrite, diacetone arabite, diacetone adonite, triacetone mannite, benzylideneglycerin, etc.

The present invention consists in uniting pyroxylin with the described substances to form colloids of a plastic nature suitable as "celluloid" by the aid of heat and suitable solvents. To the bodies so formed, camphor and other common colloiding agents as well as the ordinary fillers may be added. The mass, however formed is manipulated and worked in much the same manner as ordinary camphor-pyroxylin plastics.

One way of carrying out this invention is to take for example 60 parts by weight of pyroxylin, treat it with 30 parts by weight of alcohol and add 40 parts of methyleneglycerin. This mixture is then subjected to the same conditions of temperature and mechanical treatments as is customary in the celluloid-industry for the preparation of camphor-celluloid. The 40 parts of methyleneglycerin may be replaced by 40 parts of triacetonemannite or one of the other above-mentioned bodies. It is by no means necessary to adhere strictly to the above proportions in weight.

It is understood that the term ether as employed in the claims has reference to ethers, properly speaking, that is to say, ethers containing only alcohol radicals, and not to esters or compound ethers.

Having thus described my invention, what I claim as new is:

1. The process of forming plastic materials, which consists in adding to pyroxylin an organic compound containing oxygen linked in a closed chain between carbon atoms, to which carbon atoms no further oxygen is directly attached, and mixing the pyroxylin with such compound.

2. The process of forming plastic materials, which consists in adding to pyroxylin an organic compound containing a plurality of oxygen atoms linked in a closed chain between carbon atoms, to which carbon atoms no further oxygen is directly attached, and mixing the pyroxylin with such compound.

3. The process of forming plastic materials, which consists in adding to pyroxylin the condensation product of an aldehyde or ketone with a polyhydric alcohol and mixing the pyroxylin with such product.

4. The process of forming plastic materials, which consists in adding to pyroxylin a glycerin ether and mixing the pyroxylin with the same.

5. The process of forming plastic materials which consists in adding to pyroxylin a cyclic ether of glycerin and mixing the pyroxylin with the same.

6. As a new composition of matter, a plastic pyroxylin composition comprising pyroxylin in combination with an organic compound containing oxygen linked in a closed chain between carbon atoms, to which carbon atoms no further oxygen is directly attached.

7. As a new composition of matter, a plastic pyroxylin composition comprising pyroxylin in combination with an organic compound containing a plurality of oxygen atoms linked in a closed chain between carbon atoms, to which carbon atoms no further oxygen is directly attached.

8. As a new composition of matter, a pyroxylin composition comprising pyroxylin combined with the condensation product of an aldehyde or a ketone with a polyhydric alcohol.

9. As a new composition of matter, a plastic pyroxylin composition comprising pyroxylin together with a glycerin ether.

10. As a new composition of matter, a plastic pyroxylin composition comprising pyroxylin combined with a cyclic glycerin ether.

In testimony whereof I hereunto affix my signature in the presence of two witnesses.

LORENZ ACH.

Witnesses:
HERMANN HERMANNSDORFER,
JOS. H. LEUTE.

---

Copies of this patent may be obtained for five cents each, by addressing the "Commissioner of Patents, Washington, D. C."